United States Patent

Grosso et al.

[11] Patent Number: 4,786,874
[45] Date of Patent: Nov. 22, 1988

[54] RESISTIVITY SENSOR FOR GENERATING ASYMMETRICAL CURRENT FIELD AND METHOD OF USING THE SAME

[75] Inventors: Donald S. Grosso, West Hartford; Allen Duckworth, Middlefield, both of Conn.

[73] Assignee: Teleco Oilfield Services Inc., Meriden, Conn.

[21] Appl. No.: 898,409

[22] Filed: Aug. 20, 1986

[51] Int. Cl.$^4$ .......................... G01V 3/20; E21B 47/02
[52] U.S. Cl. .................................... 324/369; 324/373; 175/45
[58] Field of Search ............... 324/323, 356, 369, 373; 175/40, 45; 166/250, 251, 254, 255

[56] References Cited

U.S. PATENT DOCUMENTS

| | | | |
|---|---|---|---|
| 2,650,067 | 8/1953 | Martin | 324/356 |
| 3,311,876 | 3/1967 | Lee | 324/323 |
| 3,388,325 | 6/1968 | Birdwell et al. | 324/373 |
| 3,488,574 | 11/1970 | Tanguy | 324/323 |
| 4,216,536 | 8/1980 | More | 324/323 |
| 4,618,828 | 10/1986 | Raynal | 324/369 |

*Primary Examiner*—Reinhard J. Eisenzopf
*Assistant Examiner*—Walter E. Snow
*Attorney, Agent, or Firm*—Fishman, Dionne & Cantor

[57] ABSTRACT

A device for detecting and sensing the boundaries between differing rock strata is provided. This device utilizes electrical conductivity or resistivity to detect and measure the boundary layer. The device of the present invention may be used with a "measurement-while-drilling" (MWD) tool, using either wire-line or wireless data communication with a surface receiver. Moreover, the resistivity or conductivity detection device of the present invention may also be used alone or in conjunction with gamma radiation sensors. The present invention utilizes at least a pair of electrodes which occupy a small area and are located on one side of the tool aligned with the longitudinal axis thereof. Thus, in drilling a well along a specific formation stratum (which may be horizontal or inclined), the present invention will act to indicate to the driller whether the drill bit is approaching a stratum boundary, and in which direction that boundary lies. With this information, the driller can take appropriate action to change the direction of the well bore as necessary to achieve the preselected and desired path.

18 Claims, 5 Drawing Sheets

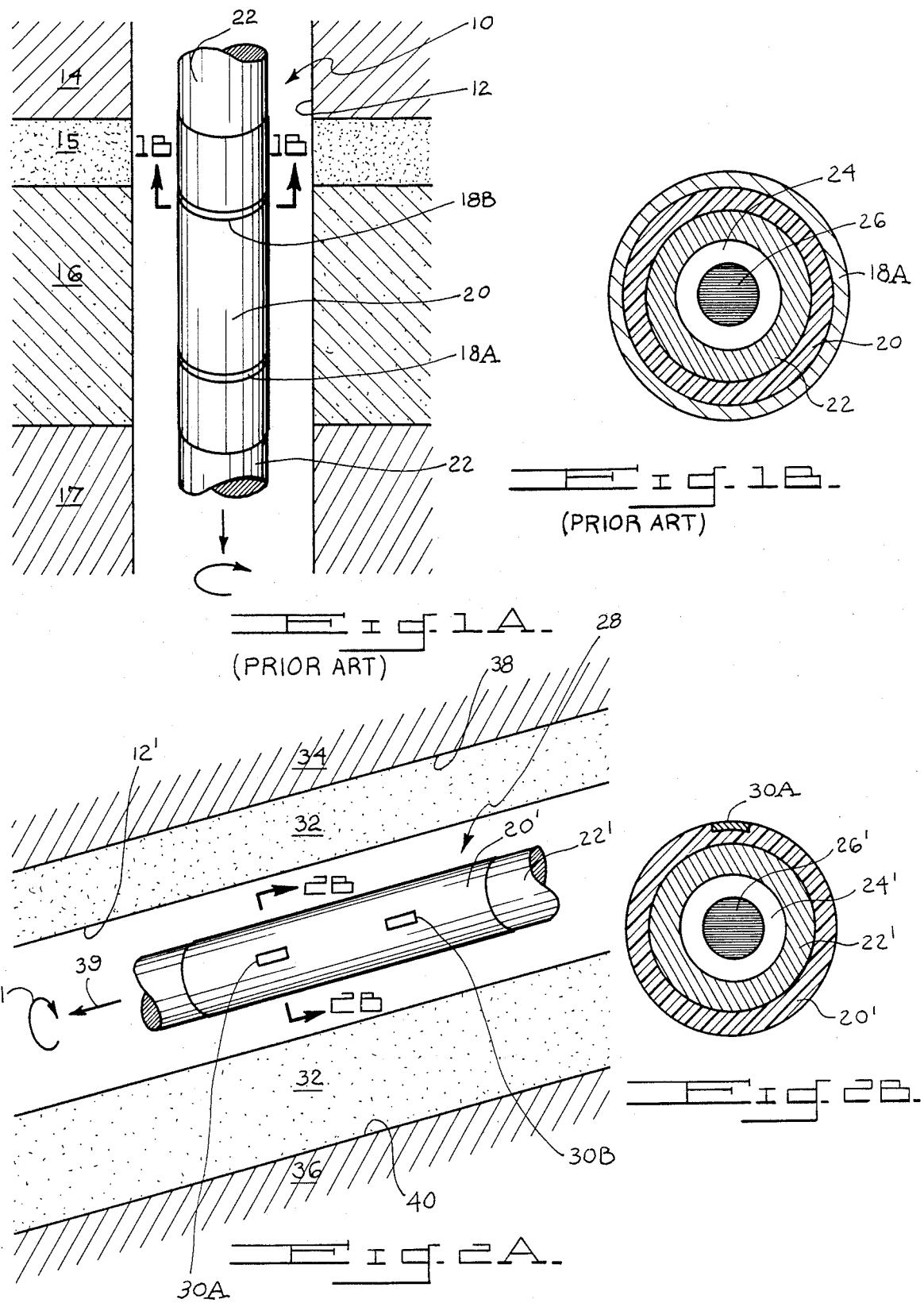

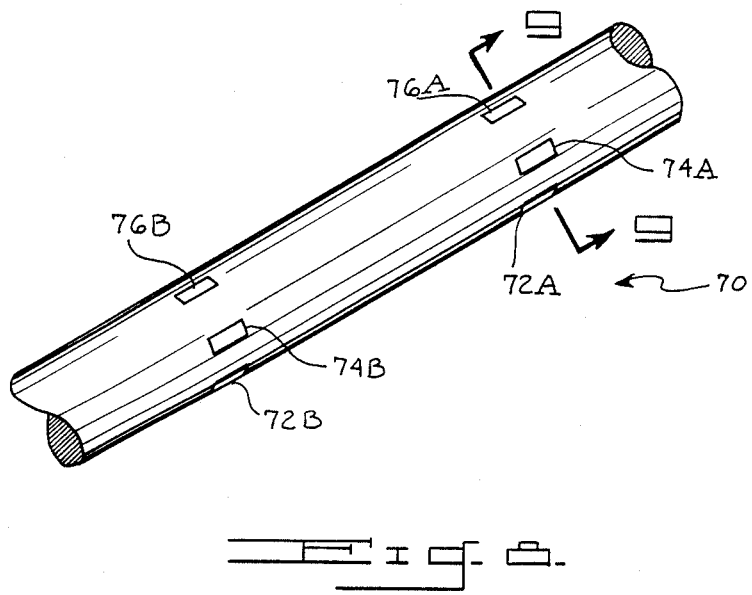
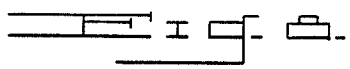
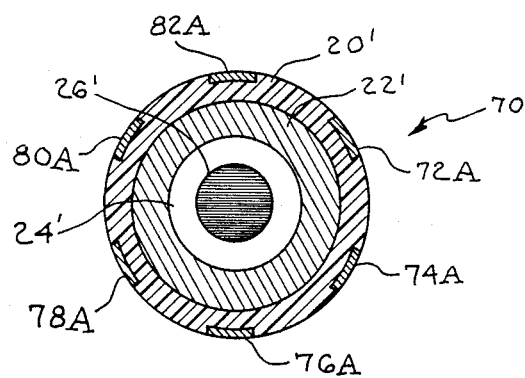
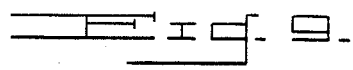

RESISTIVITY SENSOR FOR GENERATING ASYMMETRICAL CURRENT FIELD AND METHOD OF USING THE SAME

BACKGROUND OF THE INVENTION

This invention relates to a device for use in the drilling of directional (i.e., non-vertical) boreholes or wells. More particularly, this invention relates to a device for use in navigating and guiding the well being drilled along a particular stratum by detecting the approach to a boundary of the stratum and the direction of said approach. The device of the present invention detects this information which is then used to change the direction of the well away from the boundary of the stratum and back towards the preselected and desired path.

In many applications, it is necessary and desirable to drill a section of a well along a particular stratum. This stratum may be horizontal or inclined and therefore the well which is drilled therethrough must be guided so as not to deviate into adjacent strata. Accordingly, the directional driller must be provided with information which indicates when the drill is approaching a boundary between two adjacent strata, and from which direction the approach is occurring. One particularly well known application of this type of directional drilling is found in coal mining wherein boreholes are desired within a seam of coal which is typically in a horizontal or inclined stratum and is sandwiched between layers of shale or other materials. In this application, it is desired to keep the well or bore hole within the coal seam and therefore the directional driller must know when the well is approaching a shale/coal interface so that the well can be directed back into the coal seam.

One known prior art method of directional drilling within a particular stratum utilizes a sensing and detector device which is based on a gamma radiation sensor. Significantly, unlike other known gamma radiation sensors, the gamma radiation sensor used in directional drilling within a particular stratum utilizes a tungsten or lead shield covering a portion of its circumference. As a result, gamma radiation from one direction is sensed at full strength while radiation from the opposite direction is minimized by the shield. This device makes use of the fact that adjacent strata generate different amounts of radiation. Thus, by rotating the gamma radiation sensor about its axis, a nearby boundary between strata may be detected. The direction of this boundary is determined by rotating the sensor and measuring the angle at which the radiation received is maximum or minimum.

While suitable for its intended purposes, there is a perceived need in the art for additional means for measuring the boundary layer between adjacent strata during such directional drilling. This additional sensing means may be used both separately or in conjunction with exisiting gamma radiation sensor devices. An additional independent sensing means would provide an important backup system to gamma radiation systems and limit the possibility for error.

SUMMARY OF THE INVENTION

The above-discussed and other problems and deficiencies of the prior art are overcome or alleviated by the sensing and detecting device for use in directional drilling of the present invention. In accordance with the present invention, a device for detecting and sensing the boundaries between differing rock strata is provided. This device utilizes electrical conductivity or resistivity to detect and measure the boundary layer. The device of the present invention may be used with a "measurement-while-drilling" (MWD) tool, using either wireline or wireless data communication with a surface receiver. Moreover, the resistivity or conductivity detection device of the present invention may also be used alone or in conjunction with prior art gamma radiation sensors. The present invention utilizes at least a pair of electrodes which occupy a small area and are located on one side of the tool aligned with the longitudinal axis thereof.

Thus, in drilling a well along a specific formation stratum (which may be horizontal or inclined), the present invention will act to indicate to the driller whether the drill bit is approaching a stratum boundary, and in which direction that boundary lies. With this information, the driller can take appropriate action to change the direction of the well bore as necessary to achieve the preselected and desired path.

The above discussed and other features and advantages of the present invention will be appreciated and understood to those skilled in the art from the following detailed description and drawings.

BRIEF DESCRIPTION OF THE DRAWINGS

Referring now to the drawings, wherein like elements are numbered alike in the several FIGURES:

FIG. 1A is a front elevation view, partly in cross section, of a portion of a formation resistivity tool in accordance with the prior art;

FIG. 1B is a cross-sectional elevation view along the line 1B—1B of FIG. 1A;

FIG. 2A is a front elevation view, partly in cross-section, of a focussed formation resistivity tool in accordance with the present invention;

FIG. 2B is a cross-sectional elevation view along the line 2B—2B of FIG. 2A;

FIG. 8 is a front elevation view of an alternative embodiment of the present invention; and FIG. 9 is a cross-sectional elevation view along the line 9—9 of FIG. 8.

DESCRIPTION OF THE PREFERRED EMBODIMENT

Figures 3A, 4A:
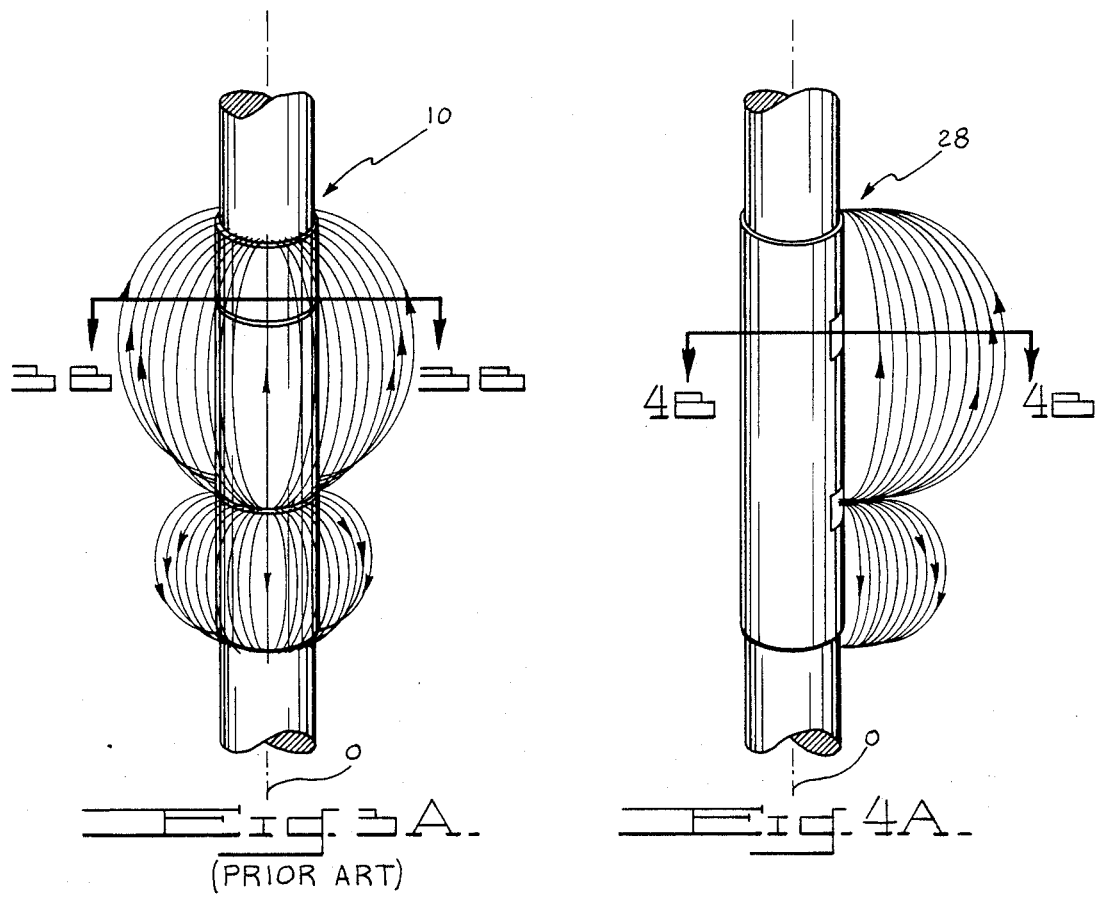
FIG. 3A is a schematic view with lines indicating the flow of current in a formation resistivity tool in accordance with the prior art.
FIG. 4A is a schematic view showing the lines of current flow in a focussed formation resistivity tool in accordance with the present invention.

Many successful and well known instruments have been used for measuring the electrical conductivity (or resistivity) of earth formations in boreholes. Several of these prior art formation resistivity devices have been adapted for use with logging or measurement-while-drilling (MWD) systems. It will be appreciated that the present invention is similar to prior art formation resistivity instruments, but has been improved for the specific purpose of navigating a drill bore along a specified stratum, particularly a stratum which is horizontal or inclined (rather than vertical).

Referring first to FIGS. 1A and 1B, a portion of a formation resistivity tool in accordance with the prior art is shown generally at 10. Thus, FIG. 1 shows a MWD version of the "short normal" resistivity sensor as is used in conventional logging-while-drilling operations. Formation resistivity tool 10 is shown disposed in a borehole 12, borehole 12 extending across several formation boundaries identified at 14, 15, and 16. The tool of FIG. 1 is optimized for drilling across the formation boundaries 14, 15, 16 and 17. The schematic cross-sectional view of formation resistivity tool 10 includes a plurality of symmetrical electrode rings 18A and 18B which are mounted in an insulated jacket 20. Jacket 20 is mounted on a drill collar 22 which surrounds a passage 24 and an instrument housing 26. It will be appreciated that drilling mud flows through passage 24 to get to the drill bit at the bottom of the borehole from the surface.

In FIGS. 2A and 2B, a "focussed" formation resistivity sensor device in accordance with the present invention is shown generally at 28. Unidirectional or focussed formation resistivity tool 28 is similar to the prior art tool 10 shown in FIGS. 1A and 1B with the exception that rather than electrode 18 having a ring shape and surrounding the entire drill collar as in the prior art, the electrodes 30A and 30B of the present invention occupy a small area and are only located on one side of the tool. It will be appreciated that the remaining structural features of tool 28 and FIGS. 2A and 2B are the same or similar to the tool 10 in FIGS. 1A and 1B and so are indicated using the same numerals with the addition of a prime. Also, unlike tool 10 which is shown disposed in a borehole vertically extending across formation boundaries, tool 28 of FIG. 2A is shown in a single stratum layer between boundaries of adjacent strata. By way of example only and for purposes of ease of discussion, the focussed formation resistivity tool 28 in FIG. 2A is located in a borehole 12' which is in a seam of coal 32, coal 32 being sandwiched between two layers of shale 34 and 36. Thus, a boundary layer 38 is formed between shale layer 34 and coal seam 32 while a boundary layer 40 is formed between shale layer 36 and coal seam 32.

Referring jointly to FIGS. 1-4, in both the prior art formation resistivity tool 10 and the focussed formation resistivity tool of the present invention, the method of obtaining the measurement of formation resistivity is the same. That is, tool electrodes are located on the outside of the tool housing which are insulated from the housing and from each other. The first electrode transmits an electric current (either direct current or a low frequency alternating current) into the borehole fluid, which must be electrically conductive, and into the surrounding formations. This current returns to the metallic, non-insulated housing of the tool. The second electrode measures the electric potential surrounding it. This potential is a measure of the current flowing in the formation, which in turn, is determined by the resistivity of the formation.

Figures 3B, 4B:
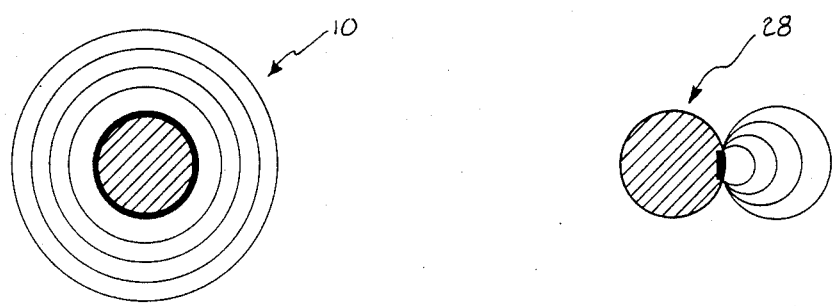
FIG. 3B is a plan view along the line 3B—3B of FIG. 3A.
FIG. 4B is a plan view along the line 4B—4B of FIG. 4A.

In the conventional logging-while-drilling tool shown in FIGS. 1A and 1B, the electrodes 18A and 18B are in the form of circular bands which surround the circumference of the tool 10. As shown in FIGS. 3A and 3B, this electrode configuration generates a pattern of current flow which is symmetrical about the axis (identified at 0) of the tool, and the response of the sensor is axisymmetric. Significantly, this axisymmetric response will be true whether the tool is rotating about its axis or whether the tool is stationary while the measurement is being made.

In contrast, in the present invention, the two electrodes 30A and 30B are in the form of small surfaces centered on a line parallel to the axis of the tool rather than as in two concentric or circular bands. As a result, the electrode configuration generates a distinctly asymmetrical current field as shown in FIGS. 4A and 4B. Similarly, the response of the sensor is also asymmetric. It will be appreciated that the details of the methods of current generation and potential measurement will be the same for both the prior art tool and the present invention. Moreover, the manner in which such current generation is made and the potential measurement taken is well known to those skilled in the art (for example, see U.S. Pat. No. 4,570,123 which is assigned to the assignee hereof and incorporated herein by reference thereto) and so no further discussion is necessary.

Figure 5A:
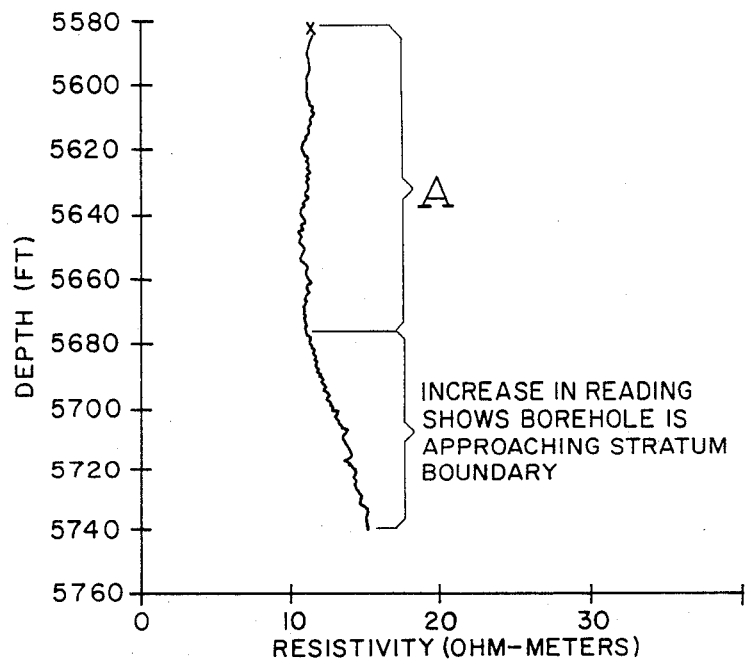
FIG. 5A is a graphical representation of a rotary drilling log plotting depth versus resistivity.

The unidirectional or asymetric response of the focussed resistivity sensor of the present invention is well suited for those drilling applications wherein assistance is needed in the navigation of the borehole along a particular stratum. A method of operating the tool of the present invention involves rotating the tool about its axis while drilling (as indicated by the arrows 39 and 41 in FIG. 2A). It will be appreciated that rotating-while-drilling is a normal practice for rotary drilling operations. While such rotating-while-drilling is being done, measurements of formation resistance are accumulated over a period of greater than one revolution of the tool. A graphical "log" is produced while drilling. If the borehole is passing through a homogenous stratum of reasonable depth, and the measurement is integrated over more than one revolution, the readings will be constant. This condition is shown in FIG. 5A wherein a rotary drilling log plotting depth versus resistivity is shown. It will be appreciated that constant readings indicating a homogenous stratum is identified in the area marked A. However, if the borehole approaches a boundary with a different formation, the readings will begin to deviate from the previous constant value. This deviation is shown as an increase in reading as identified in FIG. 5A. Such a deviation will indicate to the drilling operator that the borehole is approaching a boundary layer (i.e., 38 or 40 in FIG. 2A), of the stratum.

While the driller now knows that a boundary layer between strata is being approached, information is still necessary as to the direction in which that boundary layer lies relative to the tool in the borehole (i.e., the direction of approach). To measure this information, tool 28 is held stationary in the borehole while a resistivity reading is made. At that time, a directional survey is conducted by a sensor attached to the resistivity sensor. These measurements are then transmitted to the surface by the MWD tool and displayed, preferably graphically, by the surface receiver. This information establishes the direction in which the sensitive axis of the resistivity sensor is inclined. The tool is then moved to a new position by rotating it about its axis (this can easily be done from the surface by rotating the drill string as a whole). A new set of readings is made at this new angle, and the process is repeated several times. These measurements are then analyzed to determine the direction in which the maximum and minimum values of resistivity lie (as the maximum and minimum values of resistivity indicate the direction of the stratum boundary which is being sought). A convenient method of interpreting this data is by means of a graph. Thus, referrring to FIG. 5B, the resistivity measurements are plotted against the corresponding values of sensor direction "tool face angle". Because the form of the curve (e.g. a sine wave) is known from previous calibrations of the instrument, only a few data points (i.e. 90°, 180°, 270°, and 360°) are required to establish the complete curve and hence the desired angle defining the direction of the stratum boundary. The curve of the graph may be established by manual means, or most conveniently by a computer curve fitting program. In the example shown in FIG. 5B, the boundary of a more resistive stratum is located at a tool face angle of 180°, i.e. upward. Thus, in order to avoid drilling through this boundary layer, the drilling procedure must be changed to cause the drill to take a more downward direction. If the response of the resistivity sensor to the formations concerned are well known such as in coal/shale strata, the difference between the highest and lowest resistivity values may be used to calculate how far away the boundary is from the survey point in the well bore. The severity of the angle change required to correct the well path can then be assessed.

Figure 6:
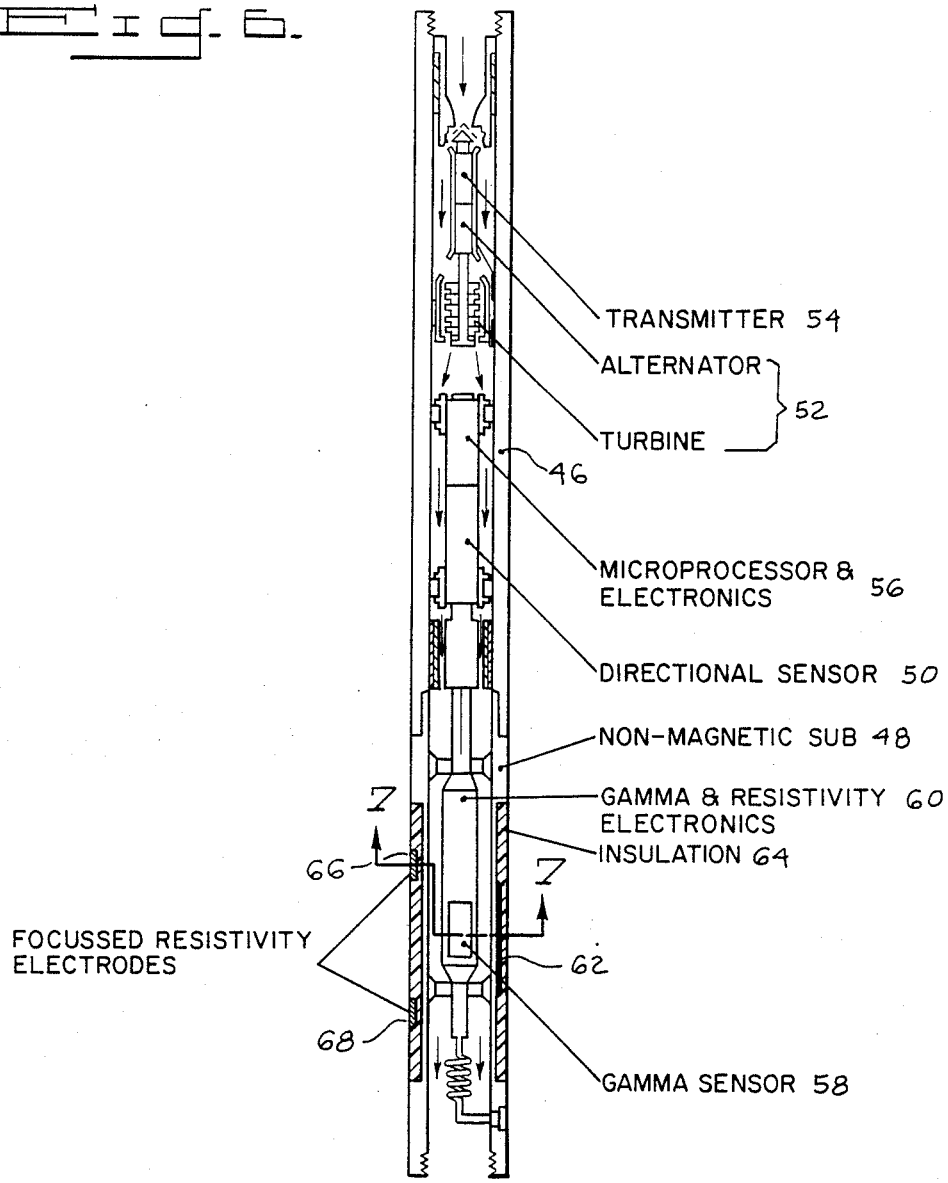
FIG. 6 is a front elevation view, partly in cross-section, of a focussed gamma and formation resistivity tool in accordance with the present invention and in conjunction with a mud pulse telemetry system.
Figure 7:
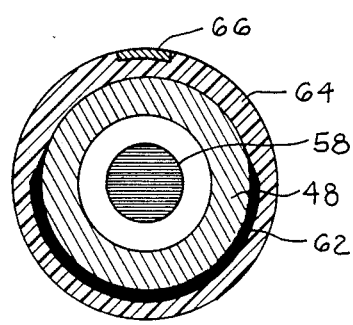
FIG. 7 is a cross-sectional elevation view along the line 7—7 of FIG. 6.

The focussed formation resistivity tool of the present invention can be used alone with an MWD tool or may also be used in conjunction with prior art "focussed" gamma radiation detectors. Referring to FIG. 6, apparatus for MWD resistivity logging is schematically illustrated. The apparatus is a "focussed" resistivity gamma directional (RGD) MWD measurement tool similar to an MWD tool presently in commercial use by Teleco Oilfield Services, Inc. (assignee of the present invention). The apparatus shown in FIG. 6 is a drill collar having an upper steel section 46 and a lower non-magnetic sub 48, sections 46 and 48 being threaded together, with appropriate electrical interconnections.

As mentioned, the "focussed" RGD tool of FIG. 6 consists of two sections 46 and 48. The upper portion of the tool houses Teleco's standard directional sensor 50, turbine/alternator 52, transmitter 54 and microprocessor and electronics 56. The downhole microprocessor 56 processes the logging data and controls the transmission sequence continuous formation gamma and resistivity data while rotating, directional data while not rotating. The transmitter 54 is a mud pulse transmitter as shown and described in U.S Pat. Nos. 3,982,431, 4,013,945; and 4,021,774, assigned to the assignee hereof and incorporated herein in their entirety.

An auxiliary sensor module is mounted in sub 48. Located in the center of this unit is the gamma ray detector (scintillation crystal) 58 and an electronics package 60. A gamma radiation shield 62 (usually comprised of tungsten or lead) covers a portion of the circumference of sub 48. In this way, gamma radiation from one direction is sensed at full strength while radiation from the other direction is minimized by the shield 62. The collar surface has an insulated region 64 with two uni-directional or focussed electrodes 66 and 68 which are used to make the resistivity measurements. Electrodes 66 and 60 are positioned along a single side of sub 48 and occupy only a small area or surface thereof. Electrodes 66 and 60 are centered on a line parallel to the axis of the tool and may be any desired shape including, but not limited to diamonds, circles, rectangles, triangles, etc. Electrical connection of the resistivity electrodes to electronics 60 may be accomplished in any standard manner known in the art. The geometry of the tool places the measured points of the "focussed" gamma ray and resistivity sensors at the same depth. This facilitates analysis and allows both measurements to be made in a zone of interest at the same time.

The "focussed" gamma ray formation resistivity tool of FIG. 6 has many features and advantages over prior art tools used in applications wherein direction drilling within a particular stratum and without deviating into adjacent strata is necessary. As mentioned hereinabove, prior art tools have heretofore utilized only focussed gamma ray detectors. Such devices make use of the fact that adjacent strata generate different amounts of radiation. Thus, by rotating this sensor about its axis, a nearby bed boundary may be sensed. The direction of the boundary is determined by rotating the sensor and measuring the angle at which the radiation received is maximum or minimum. While suitable for its intended purposes, the "focussed" gamma radiation detectors of FIG. 6 may fail through breakdown or may provide inaccurate data due to the presence of other radioactive materials.

The "focussed" formation resistivity sensor of the present invention provides an alternative method of detecting the presence and direction of boundaries between adjacent strata which operates at least as effectively as "focussed" gamma radiation sensors. Moreover, in a preferred embodiment, a combined MWD sensor tool such as shown in FIG. 6 which incorporates both focussed gamma and focussed resistivity sensors will provide alternative and/or complementary systems in the same tool. Thus, two independent readings may be checked against each other with the result being a higher confidence level, less down time and better drilling results.

Figure 5B:
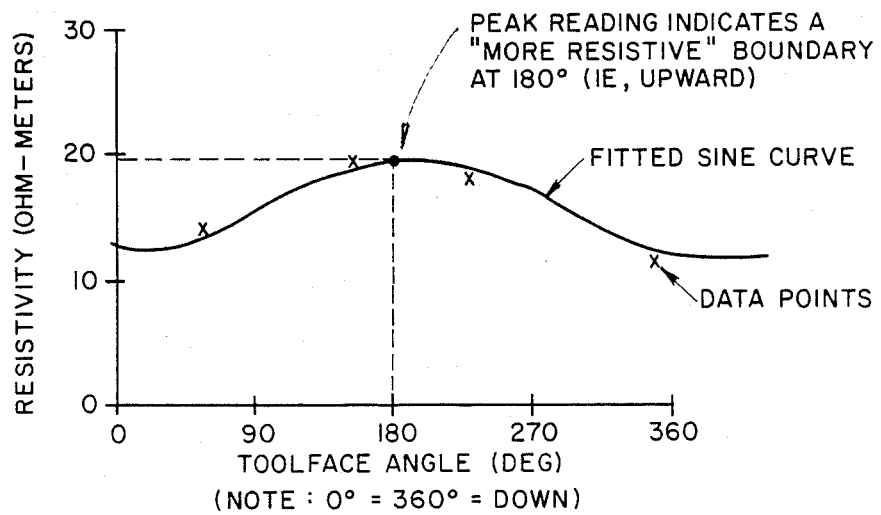
FIG. 5B is a graph plotting resistivity versus tool face angle.

As discussed with regard to FIGS. 5A and 5B, the tool must be rotated about its axis in order to determine the direction of the stratum boundary being approached. However, in certain drilling operations, particularly those operations employing mud motor assemblies, rotation of the drill string is undesired or not possible.

Referring now to FIGS. 8 and 9, an alternative embodiment of the present invention is shown at 70 wherein a focussed resisitivity tool uses a plurality of independent small electrode pairs around the circumference of the tool, with each electrode pair located on one side of the tool and aligned with the longitudinal axis thereof. Focussed formation resistivity tool 70 is similar to the tools shown in FIGS. 2 and 6 with the difference being that the additional electrode pairs are positioned at evenly spaced intervals. In the example shown in FIGS. 8 and 9, six independent pairs of electrodes 72, 74, 76, 78 and 82 are positioned at 60 degree intervals about the circumference of the tool. Each independent electrode pair is then actuated separately and the formation continuum is evaluated in relation to the tool heading without having to rotate the tool. Each independent pair of electrodes is electrically energized independently of the other pairs upon command by the tool electronics. Thus, the embodiment of FIGS. 8 and 9 has the advantage of being able to detect the direction in which the stratum boundary lies without rotation of the tool or drill string. This permits the present invention to be used in conjunction with a mud rotor assembly while concurrently examining the formation continuum.

A further enhancement when drilling in the rotary drilling mode, using either the plurality of electrode pairs or the single electrode pair embodiments, is to make the resistivity and directional measurements continuously while rotating and reckon formation discontinuities to the tool heading with a microprocessor located downhole within the tool and transmit only the vector heading of the formation discontinuity. This is accomplished in the plurality electrode pair configuration, (FIGS. 8 and 9) by measuring all electrode pairs at the same time and in the single electrode pair (FIG. 6) by measuring multiple points during one revolution of the drillstring as triggered by an azimuth sensor. The microprocessor then computes the vector using a curve fitting routine and a maximum/minimum routine (the point where the first derivative goes through zero).

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A method of determining the existence and location of substantially horizontal strata boundary in a geological strata while drilling boreholes therein with a drill string segment having a longitudinal axis, said drill string segment including a focussed formation resistivity sensor, comprising the steps of:
    generating a current field which is asymmetric with respect to the longitudinal axis of the drill string segment, the asymmetric current field being generated by the focussed formation resistivity sensor;
    sensing the presence of a substantially horizontal strata boundary by analyzing measurements of formation resistance determined by said asymmetric current field generated by said focussed formation resistivity sensor;
    sensing the location of said substantially horizontal strata boundary relative to said drill string by means of analyzing said measurements taken from said focussed formation resistivity sensor; and
    maintaining said drill string within said substantially horizontal strata during the drilling of a borehole in response to the sensed presence and location of the substantially horizontal strata boundary.

2. The method of claim 1 wherein said focussed formation resistivity sensor is manufactured from the steps of:
    forming a drill string segment having a longitudinal axis;
    surrounding a layer of electrical insulation about at least a portion of said segment along the length thereof; and
    positioning at least two electrode means for measuring the apparent resistivity of a borehole, said electrode means being positioned at predetermined locations along a single side of said segment in a line parallel to the longitudinal axis of said segment, said electrode means being disposed in said layer of insulation and occupying a small area on the surface of said segment wherein said electrode means generate a current field which is asymmetric with respect to said longitudinal axis of said drill string segment.

3. The method of claim 2 including:
    disposing gamma ray sensor means in said drill string segment; and
    positioning gamma ray shield means at a predetermined location in said layer of insulation, said shield means being in alignment with said gamma ray sensor means.

4. The method of claim 3 including:
    forming said shield means of lead or tungsten.

5. The method of claim 2 including:
    providing a plurality of independent pairs of said electrode means, each pair being evenly spaced from the other pairs about the circumference of said drill string segment.

6. The method of claim 5 including:
    disposing gamma ray sensor means in said drill string segment; and
    positioning gamma ray shield means at a predetermined location in said layer of insulation, said shield means being in alignment with said gamma ray sensor means.

7. The method of claim 6 including:
    forming said shield means of lead or tungsten.

8. The method of claim 5 including:
    connecting means to said electrode means for determining the direction of a nearby boundary in a geological strata while said drill string is rotating about its longitudinal axis 9. The method of claim 1 including:
    connecting means to said electrode means for determining the direction of a nearby boundary in a geological strata while said drill string is rotating about its longitudinal axis.

10. A method of determining the existence and location of substantially horizontal coal seam boundary in a geological strata while drilling boreholes therein with a drill string segment having a longitudinal axis, said drill string segment including a focussed formation resistivity sensor, comprising the steps of:
    generating a current field which is asymmetric with respect to the longitudinal axis of the drill string segment, the asymmetric current field being generated by the focussed formation resistivity sensor;
    sensing the presence of a substantially horizontal coal seam boundary by analyzing measurements of formation resistance determined by said asymmetric current field generated by said focussed formation resistivity sensor;
    sensing the location of said substantially horizontal coal seam boundary relative to said drill string by means of analyzing said measurements taken from said focussed formation resistivity sensor; and
    maintaining said dril string within said substantially horizontal coal seam during the drilling of a borehole in response to the sensed presence and location of the substantially horizontal coal seam boundary.

11. The method of claim 10 wherein said focussed formation resistivity sensor is manufactured from the steps of:
    forming a drill string segment having a longitudinal axis;
    surrounding a layer of electrical insulation about at least a portion of said segment along the length thereof; and
    positioning at least two electrode means for measuring the apparent resistivity of a borehole, said electrode means being positioned at predetermined locations along a single side of said segment in a line parallel to the longitudinal axis of said segment, said electrode means being disposed in said layer of insulation and occupying a small area on the surface of said segment wherein said electrode means generate a current field which is asymmetric with respect to said longitudinal axis of said drill string segment.

12. The method of claim 11 icluding:

disposing gamma ray sensor means in said drill string segment; and positioning gamma ray shield means at a predetermined location in said layer of insulation, said shield means being in alignment with said gamma ray sensor means.

13. The method of claim 12 including:

forming said shield means of lead or tungsten.

14. The method of claim 11 including:

providing a plurality of independent pairs of said electrode means, each pair being evenly spaced from the other pairs about the circumference of said drill string segment.

15. The method of claim 14 including:

disposing gamma ray sensor means in said drill string segment; and positioning gamma ray shield means at a predetermined location in said layer of insulation, said shield means being in alignment with said gamma ray sensor means.

16. The method of claim 15 including:

forming said shield means of lead or tungsten.

17. The method of claim 14 including:

connecting means to said electrode means for determining the direction of a nearby boundary in a geological strata while said drill string is rotating about its longitudinal axis.

18. The method of claim 11 including:

connecting means to said electrode means for determining the direction of a nearby boundary in a geological strata while said drill string is rotating about its longitudinal axis.

* * * * *